June 2, 1970     H. W. AVERY     3,514,882
LIGHT CONTROLLING DISPLAY APPARATUS RESPONSIVE
TO FLUID PRESSURE
Filed July 29, 1968     2 Sheets-Sheet 1
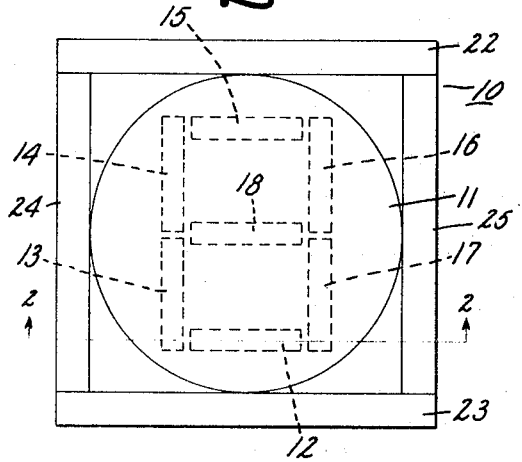
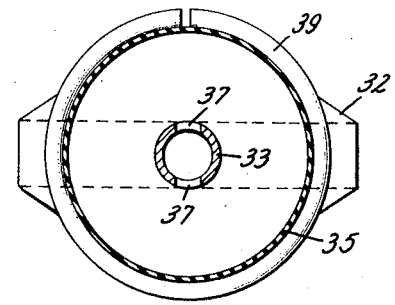
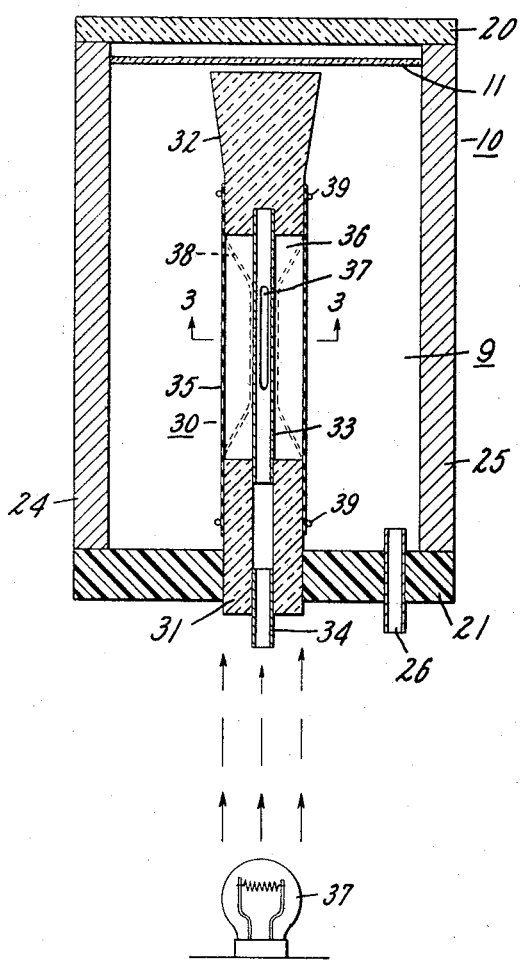
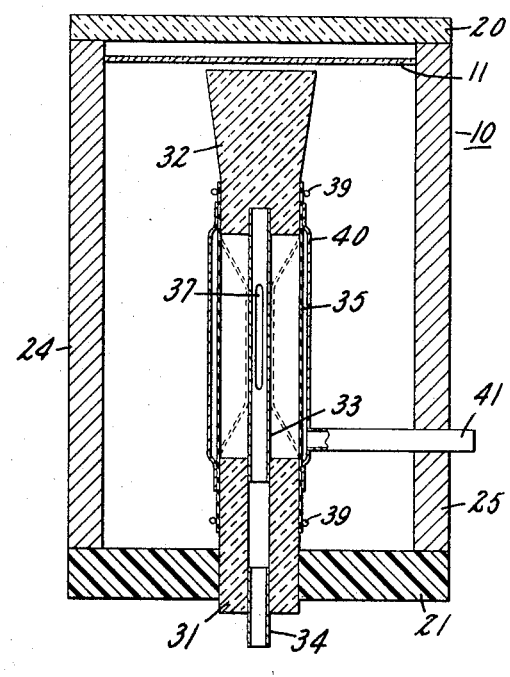
Inventor:
Howard W. Avery,
by Julius J. Zaskalicky
His Attorney

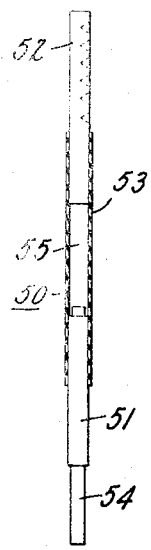
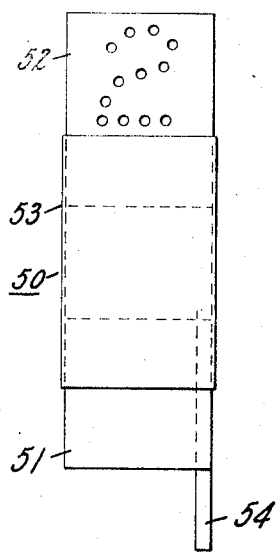
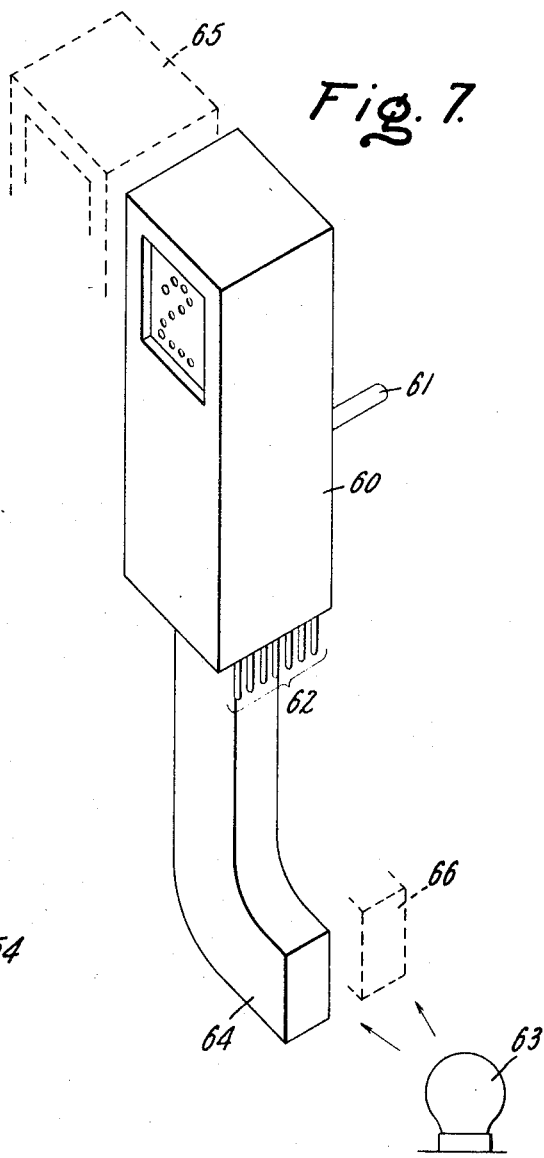

United States Patent Office 3,514,882
Patented June 2, 1970

---

3,514,882
LIGHT CONTROLLING DISPLAY APPARATUS RESPONSIVE TO FLUID PRESSURE
Howard W. Avery, Schenectady, N.Y., assignor to General Electric Company, a corporation of New York
Filed July 29, 1968, Ser. No. 748,464
Int. Cl. G09f 11/00
U.S. Cl. 40—28
10 Claims

ABSTRACT OF THE DISCLOSURE

Light for actuation of an alphanumeric display member is passed through a channel formed of an opaque and flexible tubular material. The flexible member is movable from a position in which the channel is blocked in response to an excess pressure on the outside over the inside of the channel to a position in which the channel is open in response to an excess of pressure on the inside over the outside of the channel.

---

The present invention relates in general to display apparatus responsive to fluid pressures and in particular relates to devices responsive to gas pressures to control the passage of light therethrough for use in such apparatus.

A need exists for displaying by simple means information represented by gas pressures in fluidic systems such as for example, fluidic logic elements and combinations of such logic elements. Accordingly, it is a primary object of the present invention to provide a simple and effective visual display apparatus which is responsive directly to pressure to display information available in fluidic systems in the form of pressures.

It is a general object of the present invention to provide improvements in display apparatus.

It is also an object of the present invention to provide for a fluidic system a visual display which is controlled directly by fluid parameters in the fluid system.

It is another object of the present invention to provide in a fluidic system a simple readily assembled apparatus for displaying alphanumeric information represented by fluid parameters.

A further object of the present invention is to provide a display system for providing a multiplicity of visual indications representative of parameters in a fluidic system from a single light source of constant illumination.

In accordance with an illustrative embodiment of the present invention, light from a source is channeled through a plurality of passageways. Each of the passageways includes an enclosure portion which is opaque and flexible and which is responsive to pressure differential between the inside and the outside thereof to take a form in which the passageway is either blocked or is open to light.

The novel features which are believed to be characteristic of the present invention are set forth in the appended claims. The invention itself, however, together with further objects and advantages may best be understood by reference to the following description taken in connection with the accompanying drawings in which:

FIG. 1 is a front view of an alphanumeric display apparatus embodying one form of the present invention.

FIG. 2 shows a top view of the apparatus of FIG. 1 taken along section 2—2 of FIG. 1 showing for reasons of simplicity only a single light controlling device controlling light to a single element of an alphanumeric character.

FIG. 3 is a section of the apparatus of FIGS. 1 and 2 taken along section 3—3 of FIG. 2 to illustrate the cross-section structure of the light controlling device of the apparatus.

FIG. 4 shows a light controlling device similar to the light controlling device illustrated in FIG. 2 in which the pressure on the outside of each of the individual flexible movable opaque members may be controlled independently of the pressures on other ones of such devices in an alphanumeric display apparatus such as illustrated in FIGS. 1 and 2.

FIG. 5 shows another embodiment of the light controlling device in accordance with the present invention in which the display member displays an entire alphanumeric character.

FIG. 6 is a side view of the light controlling device of FIG. 5.

FIG. 7 shows a combination of display members such as illustrated in FIGS. 5 and 6 stacked parallel in planes perpendicular to the direction from which they are viewed.

Referring now to FIGS. 1 and 2 wherein is shown apparatus 10 for displaying alphanumeric characters in the form of light areas on a ground glass plate 11 in response to pressure information supplied to the apparatus. In the apparatus the alphanumeric characters are formed by appropriate illumination of seven elemental areas 12–18, each of identical form and size but situated at different locations on the ground glass plate 11. Such elemental areas are selected to enable display of any of the desired alphanumeric characters by selective illumination of such areas. Each of the seven areas are illuminated, in response to pressures, by a light controlling device 30 only one of which, corresponding to elemental area 12, is shown in FIG. 2 for reasons of simplicity. The ground glass plate 11 and the light controlling devices are enclosed in a housing 9 which includes a front transparent plate 20, a rear opaque plate 21, an upper portion 22 and a bottom portion 23, and a pair of side portions 24 and 25. The housing is sealed and gas pressure is provided in the interior of the enclosure by means of gas duct 26.

Attention is now particularly directed to the light controlling device 30 of FIG. 2. The device includes a pair of solid, transparent members 31 and 32 which, for example may be formed of Lucite or other similar plastic material. In the embodiment shown, the rear transparent member 31 is circular in cross-section. The forward transparent member 32 is circular in cross section over the rear portion thereof and is flared inward in the vertical direction to terminate in a rectangular cross-section near the ground glass plate 11 to provide a concentration of light of rectangular form on the ground glass plate corresponding to the display element 12. The rear transparent member 31 is securely fastened in the opaque back plate 21. The forward transparent member 32 is held in aligned spaced relationship with respect to the rear transparent member 31 by a rigid tube 33 of small diameter which is securely fastened to the forward transparent member 32 and also to the rear transparent member 31 and extends through the rear transparent member to the outside, terminating in an inlet port 34. The passageway formed between the forward face of the rear transparent member 31 and the rear face of the forward transparent member 32 is enclosed by means of a flexible and opaque channel member 35 which may be formed of rubber or other suitable material which is movable in response to differences in pressure between the inside and the outside of the enclosure 36 formed thereby. The flexible channel member 35 is secured to members 31 and 32 by spring clips 39. Apertures 37 are provided in the tube 33 to permit gas to flow from the inlet port 34 through the tube to the enclosure 36.

A light source 37 is directed to provide light to the rear transparent member 31. When pressure applied through the inlet port 26 to the inside of the housing is greater than the pressure applied through the input port 34 to the inside of the enclosure 36, the opaque flexible member 35 is aligned as shown, that is, extending outward and enabling light to pass through the rear transparent member 31 to the forward transparent member 32 where it is channeled to illuminate element area 12. When the pressure on the outside of the enclosure 36 is greater than within the enclosure, the flexible opaque member 35 collapses inward as shown by the dotted envelope 38 and obstructs the passage of light from the rear transparent member 31 to the forward transparent member 32 and thereby producing no illumination of the element area 12.

FIG. 3 represents a cross-sectional view of the housing and shows the structure of the support tube 33 with apertures 37. A pressure applied to the inside of the housing 9 through the port 26 may be common to all of the seven devices included therein to enable each of the elemental areas 12–18 to be selectively energized, as desired. Accordingly, control of the pressure to each of the individual light controlling devices corresponding to respective ones of the element areas of the alphanumeric character is provided.

Should it be desired to control individually the pressure on the outside of each of the light controlling devices, a structure such as shown in FIG. 4 may be used. The elements of FIG. 4 corresponding to the elements of FIG. 2 are designated by the same numerals. The structure of the light controlling device of FIG. 4 is identical with the light controlling device of FIG. 2 with the exception that a rigid cylindrical member 40 is provided about the flexible opaque member 35. The member 40 is rigidly connected to the rear transparent member 31 and also to the forward transparent member 32, and is provided with a duct 41 to enable the pressure on the outside of the flexible opaque member 35 in each of the devices to be separately controlled.

Referring now to FIGS. 5 and 6, there is shown a light controlling device 50, similar to the light controlling device of FIG. 2 and representing another embodiment of the present invention, in which is provided a rear transparent member 51 and the forward transparent member 52 are held in spaced relationship by suitable means (not shown), for example, a common housing or support structure.

The forward transparent member 52 has a series of tapered holes formed in one flat face thereof and oriented to form an alphanumeric character. A piece of flexible and opaque tubing 53 is secured to the two transparent members 51 and 52 to form an enclosure or passageway 55. A duct 54 is provided through the rear transparent member 51 to enable pressure to be applied within the enclosure or passageway 55 formed by the forward face of the rear transparent member 51 and the rear face of the forward transparent member 52. Light from a source (not shown) is directed at the rear transparent member 51 from which it passes through the passageway 55 to the forward transparent member 52 and is selectively intercepted and deviated forward in a direction normal to the broad flat face thereof by the holes formed therein to provide a visual indication of the alphanumeric figure formed by the holes.

Light controlling device 50 may be enclosed in a housing member 9 such as described in connection with the apparatus of FIG. 2 in which pressure within the housing is provided on the outside of the flexible opaque member 53. When such pressure exceeds the pressure applied through duct 54 to the inside of pasasgeway 55, the flexible tubing 53 collapses and blocks the passage of light from the rear transparent member 51 to the forward transparent member 52. When the pressure on the inside of the enclosure or passageway 55 exceeds the pressure existing on the outside of such passageway 55, then of course light is allowed to pass through and produce the indication formed on the face of the plate 52.

Individual light controlling devices such as shown in FIGS. 5 and 6 but each having a different alphanumeric indication thereon may be stacked in depth as shown in FIG. 7 in a common housing 60 to provide over one viewing area any one of a number of alphanumeric indications in response to the pressures applied to each one of such devices. The common or bias pressure may be applied through duct 61 to control the pressure on the outside of all of the flexible opaque members of each of the light controlling devices. The pressure to control the condition of each of the light controlling devices is applied to a respective inlet duct of the group collectively designated 62. Each of the inlet ducts of group 62 corresponds to duct 54 of the device of FIGS. 5 and 6. Light from a common source 63 is channeled through a light pipe 64 to the light controlling devices contained in housing 60. The light pipe 64, for example, Lucite, would channel the light from a constant illumination source to each one of the rear or transparent light members of the light controlling devices. Another series of light controlling devices stacked in depth identical to the unit 60 may be located side by side to enable more complex alphanumeric indications to be displayed. The dotted box 65 shows such an identical unit. Such unit is supplied by a light pipe 66, indicated by the dotted lines, from the same common source 63.

While I have shown particular embodiments of my invention, it will of course be understood that I do not wish to be limited thereto since many modifications may be made in the structural arrangement shown and in the instrumentalities employed. I contemplate by the appended claims to cover any such modifications as fall within the true spirit and scope of my invention.

What I claim as new and desire to secure by Letters Patent of the United States is:

1. A light controlling device comprising:
   a solid transparent member,
   another solid transparent member spaced from said one member to form the ends of a passageway for light therebetween,
   an enclosure for said passageway secured to said transparent members including a flexible and movable opaque member,
   means for applying gas pressure on the inside of said enclosure,
   means for applying gas pressure on the outside of said enclosure,
   said flexible and movable member being movable from a position in which the passageway is blocked in response to an excess of pressure on the outside over the inside of said enclosure to a position in which the passageway is open in response to an excess of pressure on the inside over the outside of said enclosure.

2. The device of claim 1 in which said enclosure is a flexible opaque tube secured to the ends of said transparent members.

3. The device of claim 1 in which the ends of said transparent members forming the ends of said passageway are generally circular in cross section.

4. The device of claim 1 in which the ends of said transparent members forming the ends of said passageway are generally rectangular in cross section.

5. The device of claim 2 in which said transparent members are held in spaced relationship by a thin rigid tube secured to the ends thereof and passing through said transparent members, the wall of said thin tube within said enclosure having an opening.

6. The device of claim 1 including a light source directed to supply light to one end of said passageway.

7. The device of claim 6 including a light display member responsive to light emanating from the other end of said passageway.

8. The device of claim 7 in which said display member displays an element of an alphanumeric character.

9. The device of claim 7 in which said display member displays an alphanumeric character.

10. In combination, a plurality of alphanumeric display members, a plurality of light controlling devices, each of said display members responsive to light from a respective one of said light controlling devices, each of said light controlling devices including:
   a solid transparent member,
   another solid transparent member spaced from said one member to form the ends of said passageway for light therebetween,
   an enclosure for said passageway secured to said transparent members including a flexible and movable opaque member,
   means for applying gas pressure on the inside of said enclosure,
   means for applying gas pressure on the outside of said enclosure,
   said flexible and movable member being movable from a position in which the passageway is blocked in response to an excess of pressure on the outside over the inside of said enclosure to a position in which the passageway is open in response to an excess of pressure on the inside over the outside of said enclosure.

References Cited

UNITED STATES PATENTS

| | | | |
|---|---|---|---|
| 2,931,027 | 3/1960 | Blefary | 40—28 X |
| 3,114,283 | 12/1963 | Gruner | 40—130 |
| 3,210,876 | 10/1965 | Towne | 40—130 |
| 3,226,864 | 1/1966 | Rehler | 40—130 |
| 3,413,744 | 12/1968 | Bowles | 40—130 |

EUGENE R. CAPOZIO, Primary Examiner

W. J. CONTRERAS, Assistant Examiner

U.S. Cl. X.R.

40—130; 350—96, 267